Oct. 23, 1934.   C. P. GALANOT   1,978,043
HOIST FOR DUMP VEHICLES
Filed Jan. 27, 1931   11 Sheets-Sheet 1

Fig.1.

INVENTOR
Camille P. Galanot
by his attorneys
Byrnes, Stebbins,
Parmelee & Blenko Oct. 23, 1934. C. P. GALANOT 1,978,043

HOIST FOR DUMP VEHICLES

Filed Jan. 27, 1931  11 Sheets-Sheet 5

Oct. 23, 1934.  C. P. GALANOT  1,978,043
HOIST FOR DUMP VEHICLES
Filed Jan. 27, 1931   11 Sheets-Sheet 6

Fig. 8.

Fig. 9.

INVENTOR
Camille P. Galanot
by his attorneys
Byrnes, Stebbins, Parmelee & Blenko Oct. 23, 1934.                C. P. GALANOT                1,978,043
                          HOIST FOR DUMP VEHICLES
                    Filed Jan. 27, 1931        11 Sheets-Sheet 8

Oct. 23, 1934.　　　C. P. GALANOT　　　1,978,043
HOIST FOR DUMP VEHICLES
Filed Jan. 27, 1931　　　11 Sheets-Sheet 9

INVENTOR
Camille P. Galanot
by his attorneys
Byrnes, Stebbins, Parmelee & Blenko Oct. 23, 1934.  C. P. GALANOT  1,978,043
HOIST FOR DUMP VEHICLES
Filed Jan. 27, 1931   11 Sheets-Sheet 11

Patented Oct. 23, 1934

1,978,043

UNITED STATES PATENT OFFICE 1,978,043

HOIST FOR DUMP VEHICLES

Camille P. Galanot, Youngstown, Ohio, assignor to The Commercial Shearing & Stamping Company, Youngstown, Ohio, a corporation of Ohio Application January 27, 1931, Serial No. 511,530

12 Claims. (Cl. 60—52)

My invention relates to a hydraulic hoist or jack for operating a vehicle body tiltably mounted on the frame of the vehicle. The hoist is particularly designed for application to a vehicle having a body adapted for rear dumping only, although many of the features of the invention may be applied equally well to bodies of other types, such as those adapted for dumping to both sides, as well as to the rear.

In dumping vehicles of the character previously known, many disadvantages and undesirable features have been discovered in practice. The usual construction in this type of device includes a body pivoted on a vehicle frame for dumping to the rear, and a jack secured to the frame and to the body for lifting the latter and tilting it about its dumping axis. The jack is usually a hydraulic device and, in all of the instances of which I am aware, it is mounted vertically or substantially so. Since a satisfactory jack has a certain minimum collapsed height, such mounting of the hoist requires the provision of a substantial clearance between the top of the vehicle drive gear and the bottom of the tilting body. In order to provide the required inclination of the body when dumping, the jack requires a long stroke, and this fact, in turn, influences the collapsed height of the jack.

In the dumping vehicles of the prior art, the jacks not only require a large clearance between body and frame, but are generally connected to the frame in the rear of a cross beam which is found in most truck chassis at about the front end of the rear springs. This arrangement complicates the difficulties encountered by reason of the large mounting height required for the jack. The jack has heretofore been connected to the body at a point to the rear of its center of gravity. Thus, the initial moment of the hoisting force is so small that high pressures are required to operate the jack.

It has also been customary heretofore to provide a separate hoist cylinder, valve, pump and reservoir for controlling and circulating the operating fluid therethrough. These different devices are independently mounted and connected by flexible tubing. This construction has a high tendency to failure because of the numerous joints and connections in the fluid system. Generally, furthermore, the relative positions of the various elements are more or less fixed, and it is difficult to adapt the system to different design of vehicles.

I have invented a hydraulic hoist and mounting therefor which overcomes the aforementioned disadvantages and provides a device of the character mentioned having many desirable features in addition. In accordance with the invention, I mount the hoist or jack so that its axis makes an acute angle with the horizontal. The lower end of the jack is secured to the vehicle frame forward of the usual cross beam and the upper end of the jack is connected to the body in the rear of said cross beam but, at the same time, forward of the center of gravity of the body.

By mounting the hoist between the frame and the body at a sharp angle to the horizontal, the device requires only a minimum mounting height. The connection of the hoist to the body at a point ahead of the center of gravity of the latter gives the hoist a greater moment for its lifting effort. The moment, of course, increases from the time when the body is first tilted until the final tilting position is reached, in which the axis of the jack is at substantially right angles to the bottom of the body. The increased moment makes it unnecessary to employ high pressures on the jack operating fluid, especially where nested plungers of decreasing diameter are employed. By connecting the lower end of the jack to the frame ahead of the cross beam, I avoid mechanical complications which have heretofore been experienced because of the space occupied by the driving gear under the frame at the rear thereof.

I avoid the disadvantages resulting from the use of a separate jack, cylinder, valve and reservoir by forming these elements in a single unitary casting. All flexible connections and joints are thereby eliminated and the liability to failure is considerably reduced. I also improve the control valve by embodying therein a ball check valve, so that the hoist will remain in any position to which it is raised, until the control valve is actuated to the lowering position. The reservoir comprises a jacket surrounding and enclosing the cylinder and having connection to a pump secured to the unitary casting. I provide means for securing the pump to one of two alternative positions on the casting, so that the device may be adapted to different forms of vehicles.

In order to increase the range of adaptability of the invention to vehicles of different types and designs, I provide an adapter which is so constructed as to replace the pump on the hoist casting. The pump itself is secured to the free end of the adapter. The adapter consists of a casting having ports corresponding to those of the hoist casting and pump. The ports are connected by passages which may or may not cross over each other so as to provide for different directions of drive for the pump impellers. The passages of the adapter will preferably include a substantially right-angle turn so that the pump will be positioned vertically instead of horizontally. By adjusting the adapter with respect to the hoist casting and the pump with respect to the adapter, a universal adjustment can be effected.

I also provide relief valves for the hoist cylinder actuated by the extension of the jack to a predetermined point. After the jack has reached this point, the pressure in the cylinder is relieved and further extension of the jack prevented. In one form of jack operated relief valve, I have provided for the adjustment of the point at which the relief valve is operated.

In another form of relief valve operating mechanism, the construction is sufficiently substantial to withstand the sudden tension likely to be applied thereto if the truck is started while the body is in dumping position. This form is adaptable for multiple plunger jacks.

The connections of the jack to the frame and body of the vehicle include a double trunnion forming a universal joint. This relieves the body and frame from all strains incident to dumping when the vehicle is standing on unlevel ground or when the load in the body is not uniformly distributed.

For a complete understanding of the invention, reference is made to the accompanying drawings illustrating a present preferred embodiment thereof. The embodiment illustrated, however, does not constitute any limitations upon the scope of the invention, since it may be otherwise constructed.

Figure 1:
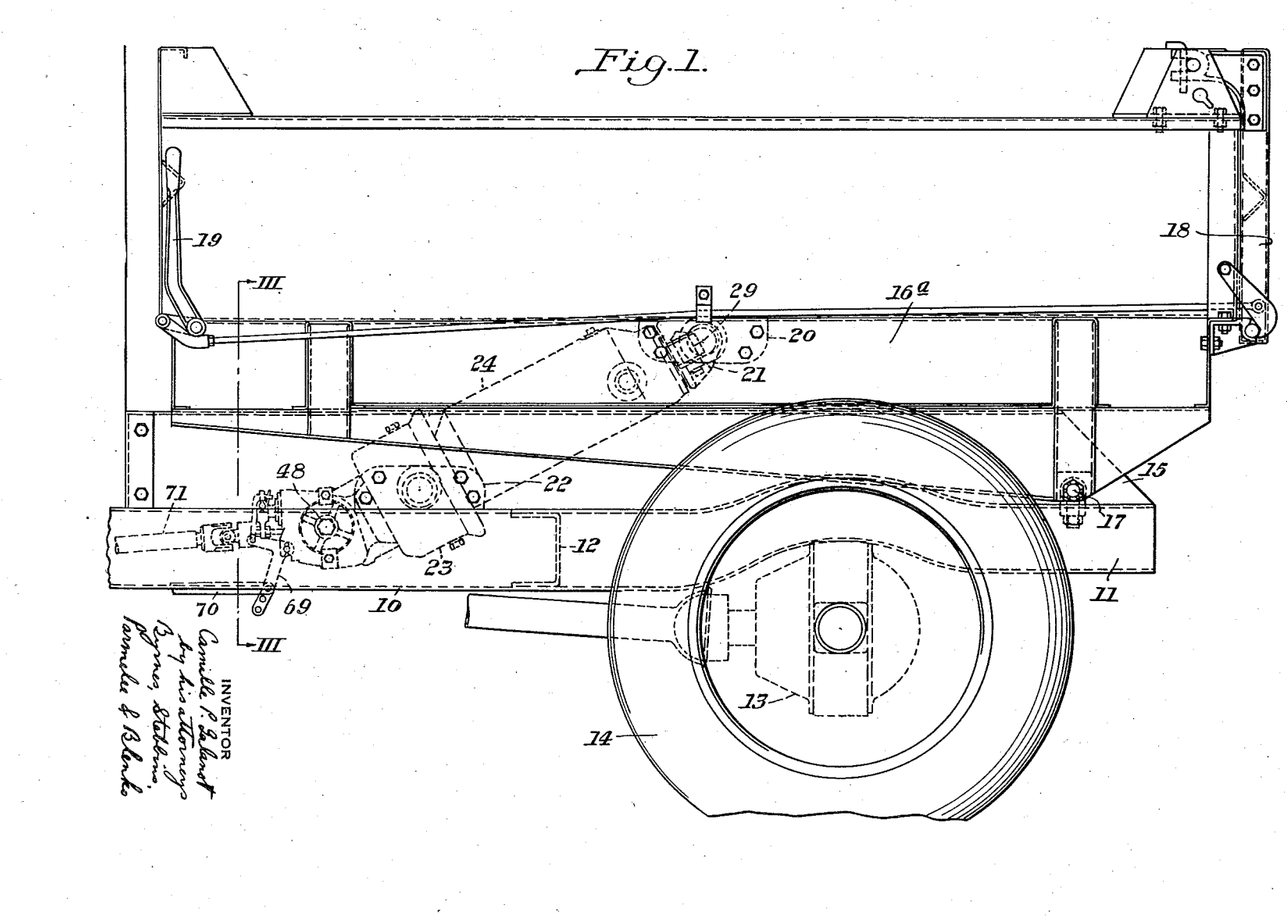
Figures 2, 2A, 13:
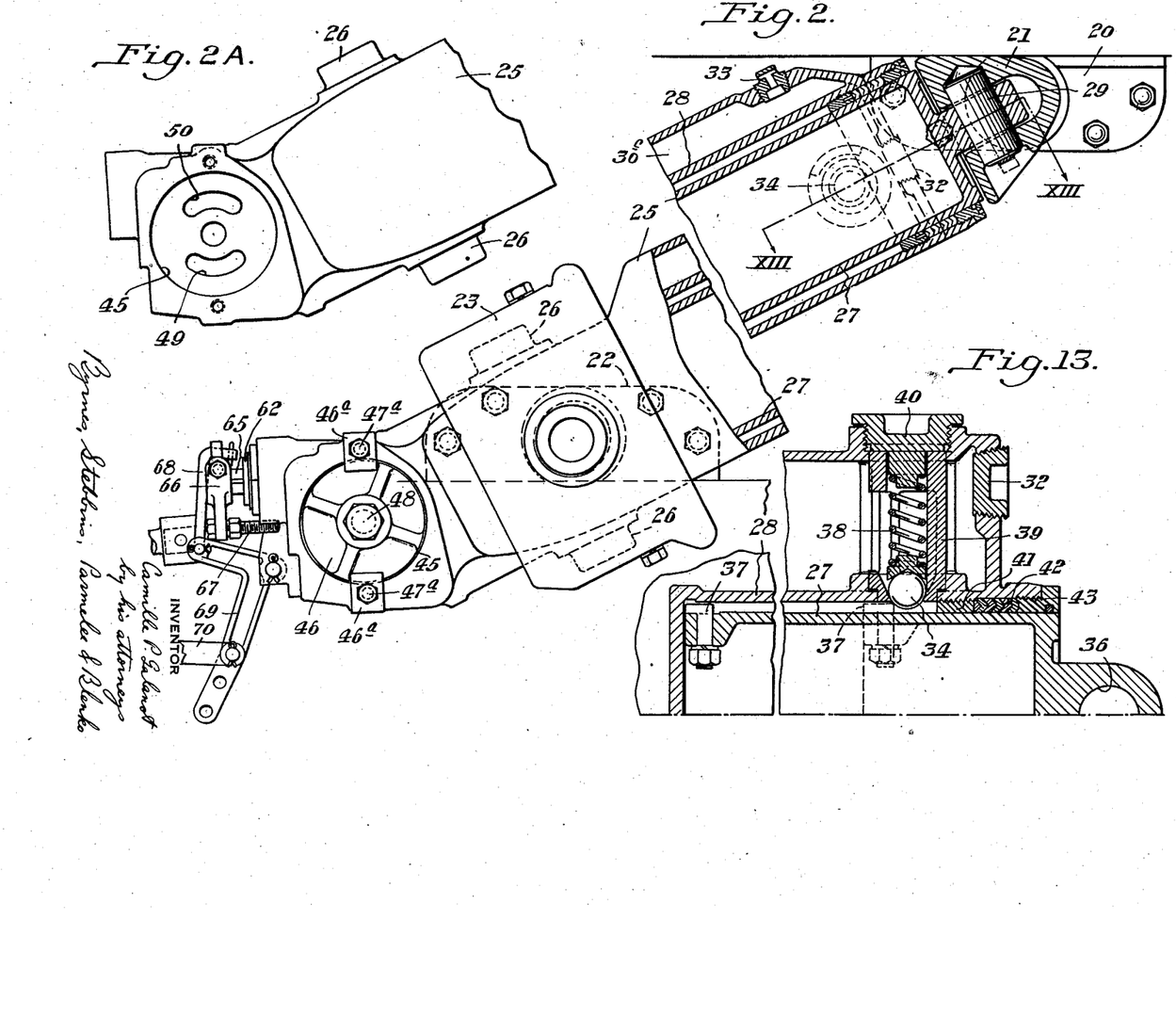
Figure 3:
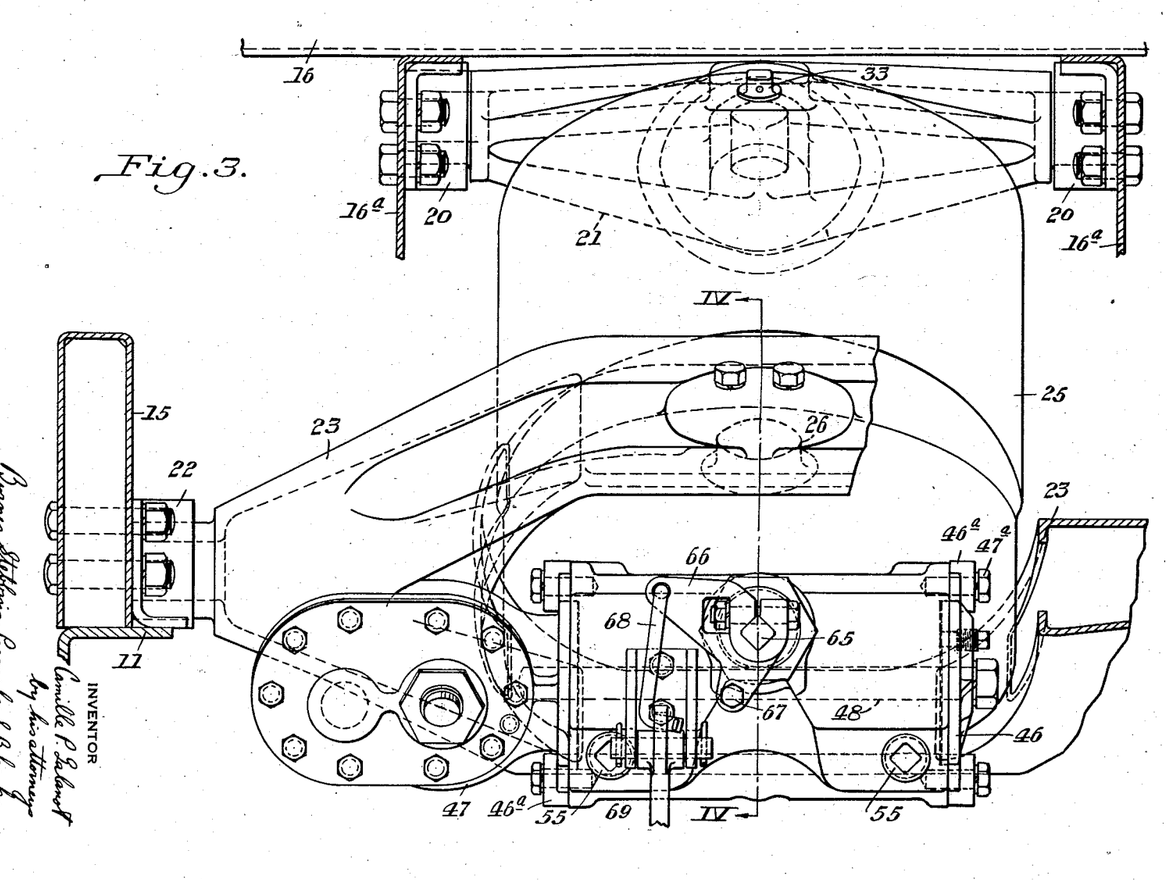
Figures 4, 12:
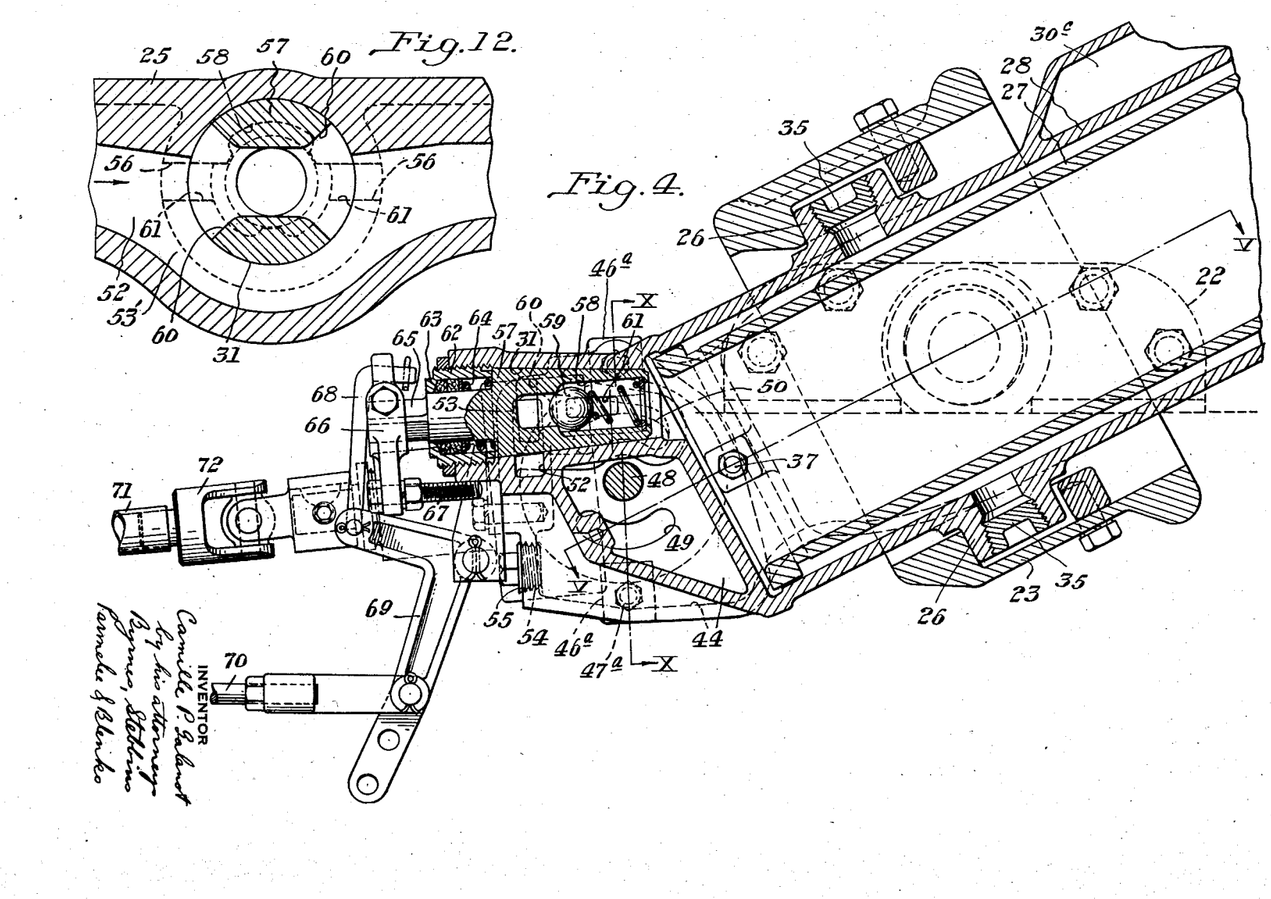
Figure 5:
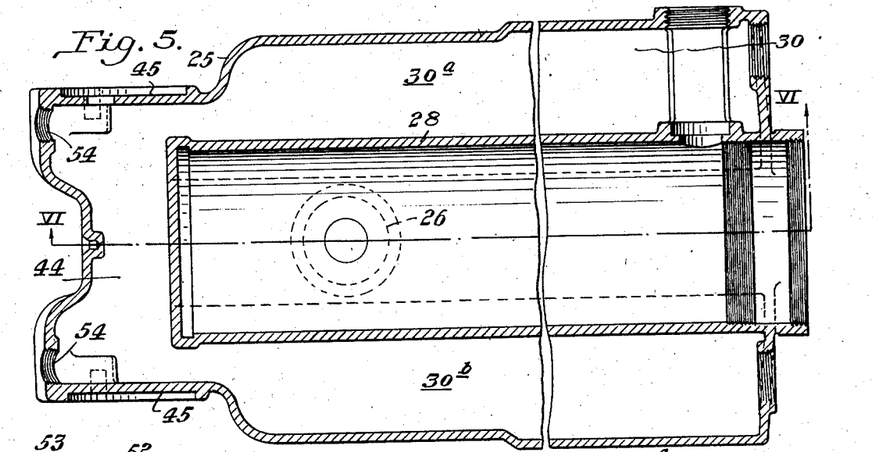
Figure 6:
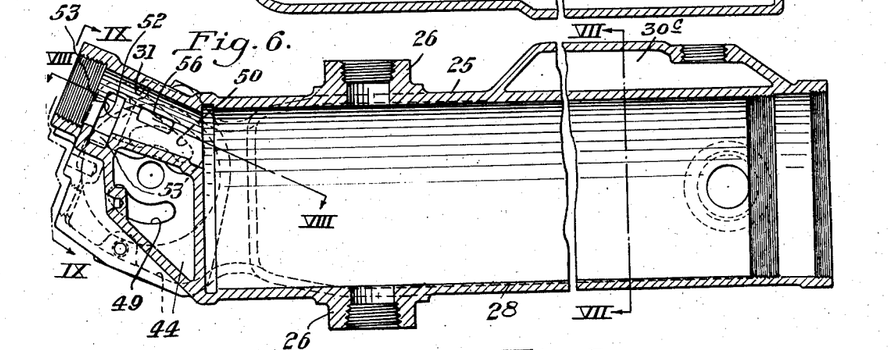
Figure 7:
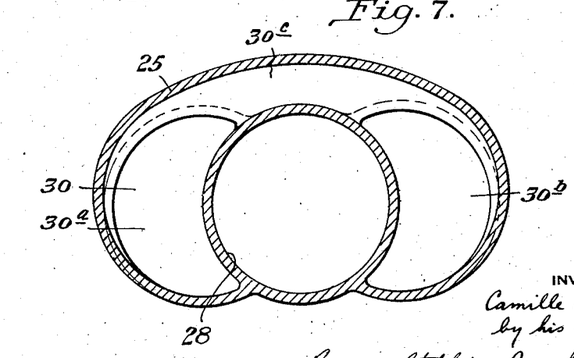
Figure 8:
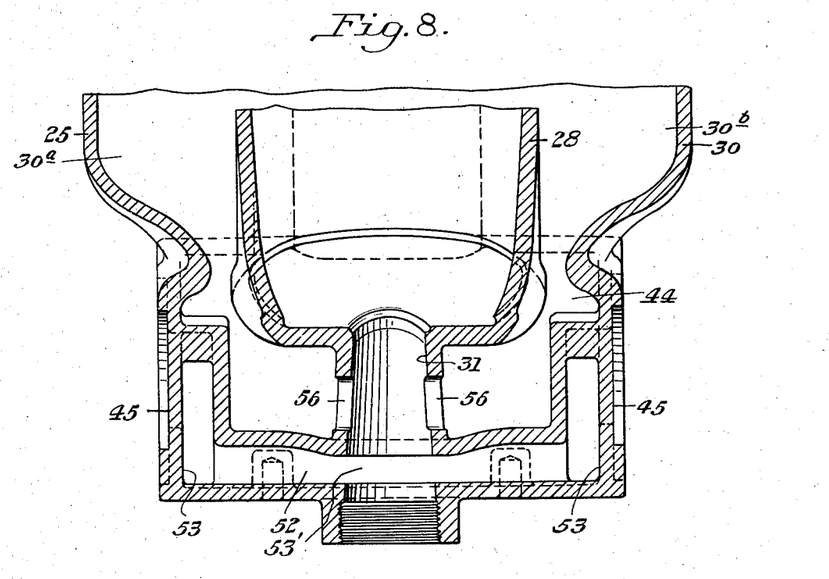
Figure 9:
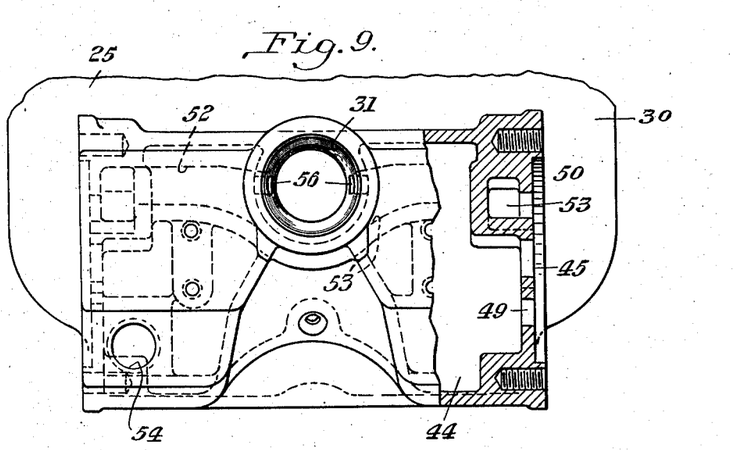
Figure 10:
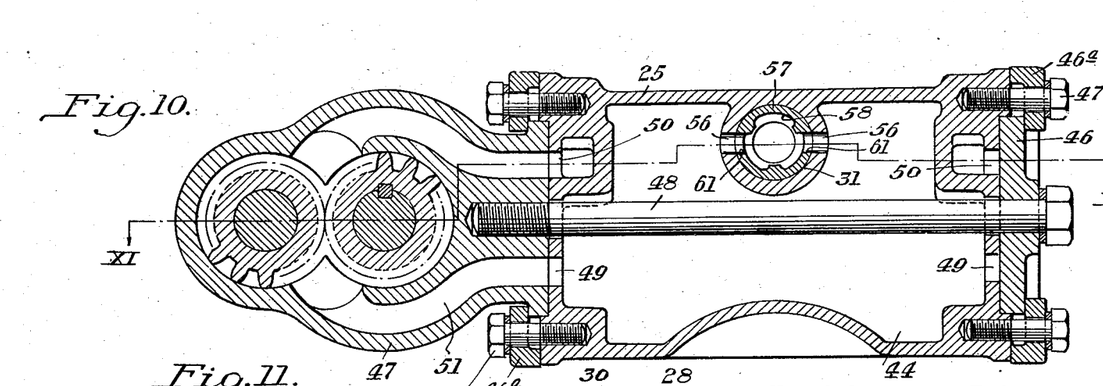
Figure 11:
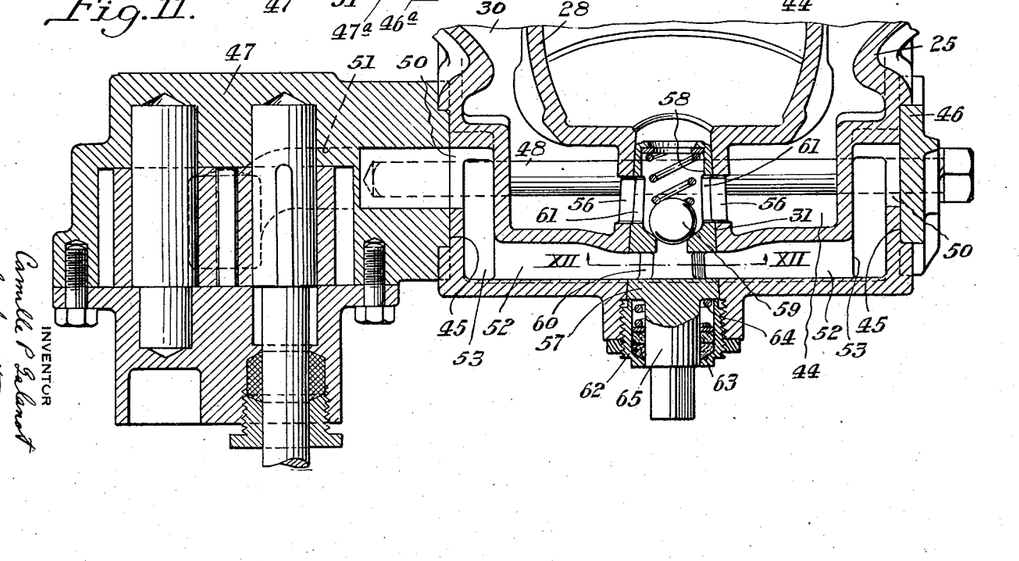

In the drawings—Figure 1 is a partial side elevation of a motor truck chassis having a dumping body thereon adapted to be actuated by a hoist constructed in accordance with the invention;

Figure 2 is a side elevation to enlarged scale partly broken away and partly in longitudinal section showing the hoist and its trunnion mountings;

Figure 2a is a partial side elevation of the hoist casting apart from its mountings and auxiliary equipment;

Figure 3 is a partial sectional view substantially along the line III—III of Figure 1, showing the hoist in end elevation, looking toward the rear thereof;

Figure 4 is a partial sectional view of the hoist taken along the line IV—IV of Figure 3;

Figure 5 is a sectional view through the hoist casting with all other members removed therefrom, along the line V—V of Figure 4;

Figure 6 is a sectional view along the line VI—VI of Figure 5;

Figure 7 is a similar view along the line VII—VII of Figure 6;

Figure 8 is a sectional view along the line VIII—VIII of Figure 6;

Figure 9 is an end view of the structure shown in Figure 6, substantially along the line IX—IX thereof;

Figure 10 is a sectional view through the lower end of the hoist casting and the pump associated therewith, along the line X—X of Figure 4;

Figure 11 is a sectional view along the line XI—XI of Figure 10;

Figure 12 is a sectional view along the line XII—XII of Figure 11;

Figure 13 is a sectional view along the line XIII—XIII of Figure 2; and

Figure 14:
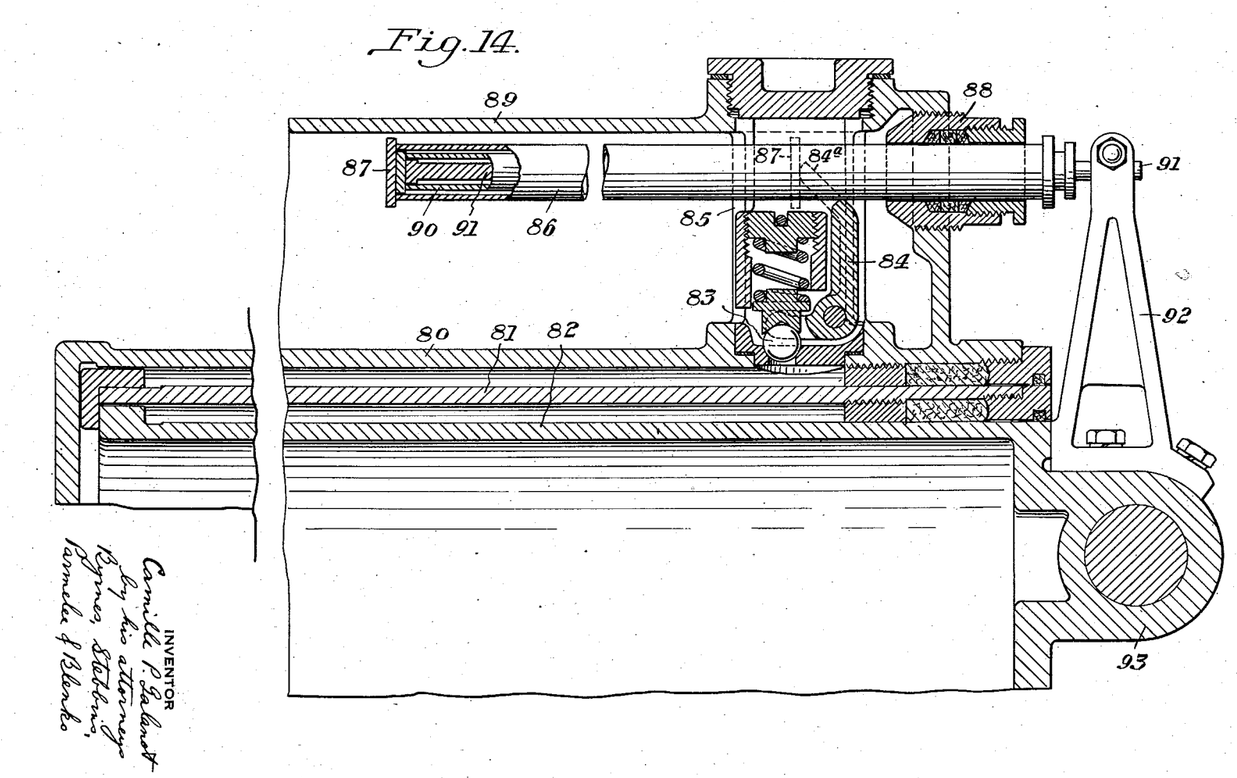
Figure 15:
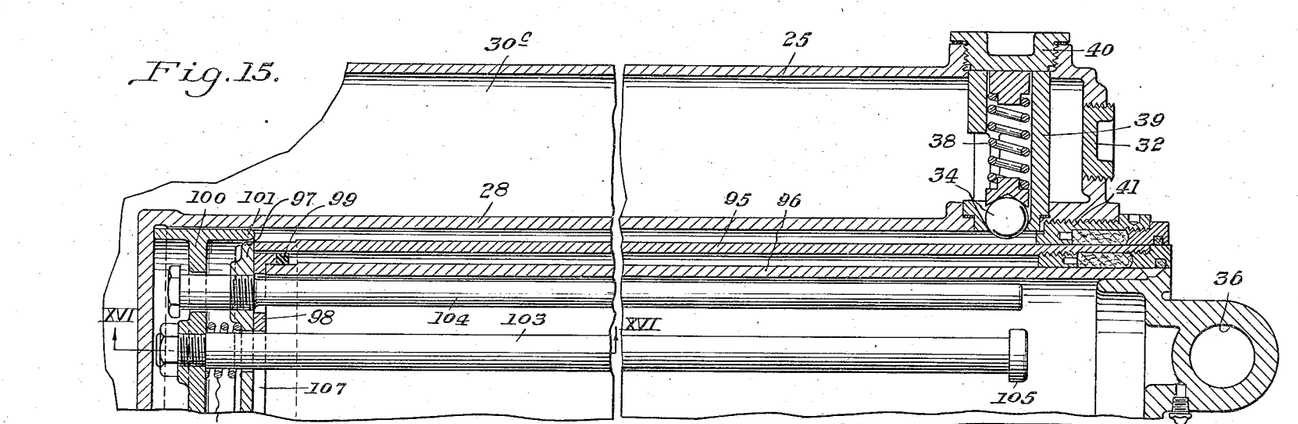
Figure 16:
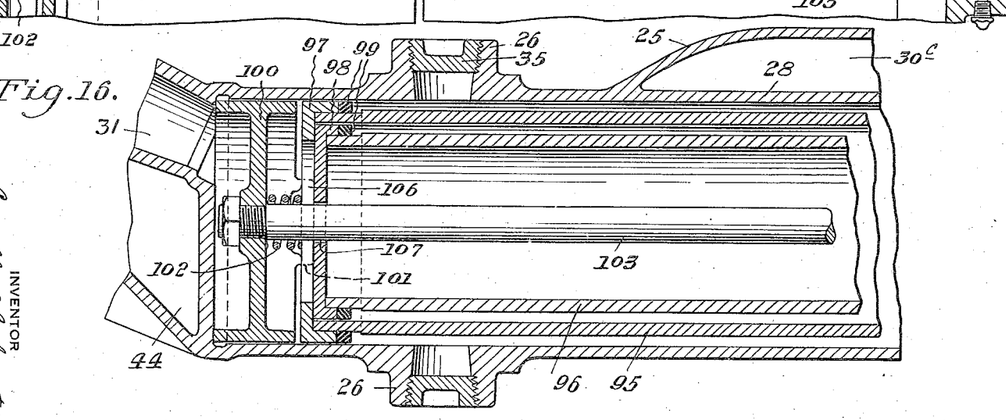

Figure 14 is a sectional view similar to Figure 13 showing a modified form of safety limit stop;

Figure 15 is a view similar to Figure 14 showing another form of safety limit stop;

Figure 16 is a sectional view along the line XVI—XVI of Figure 15.

Figure 17:
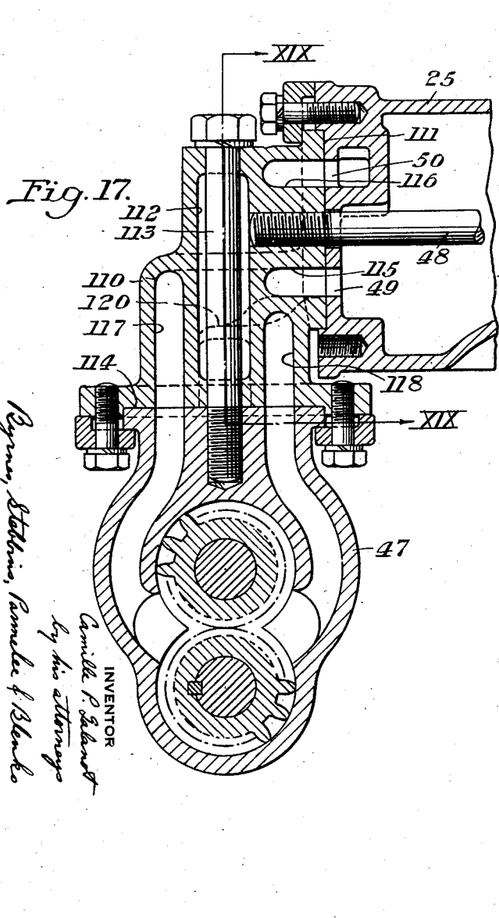
Figures 18, 19, 20:
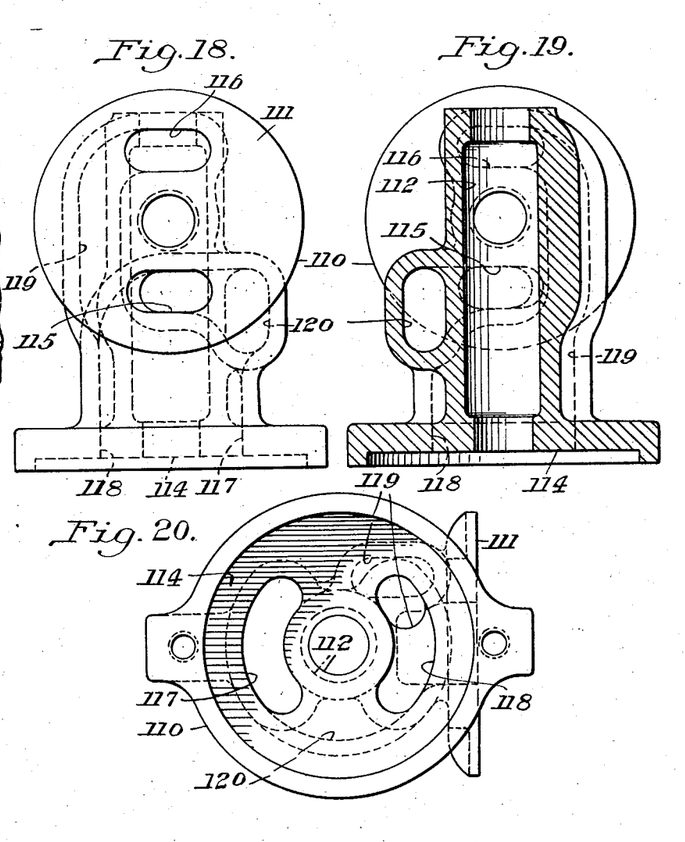
Figure 21:
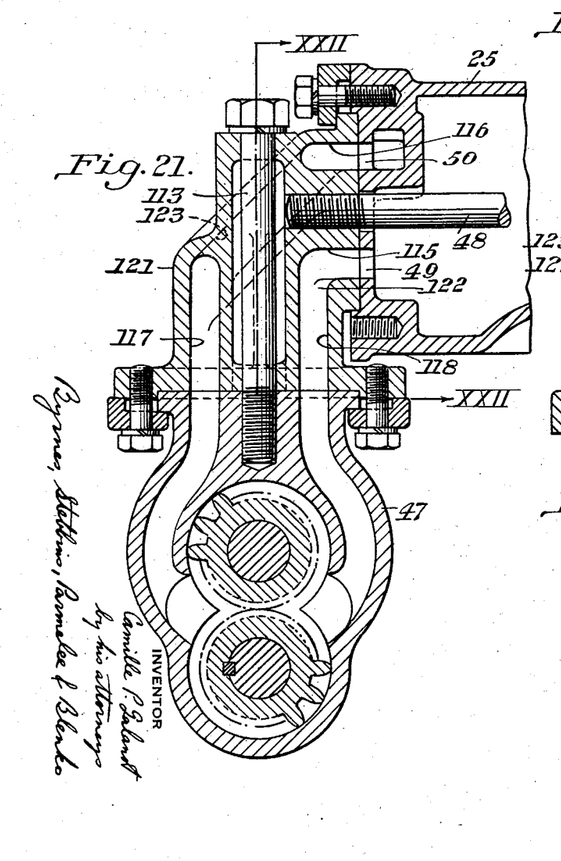
Figures 22, 23, 24:
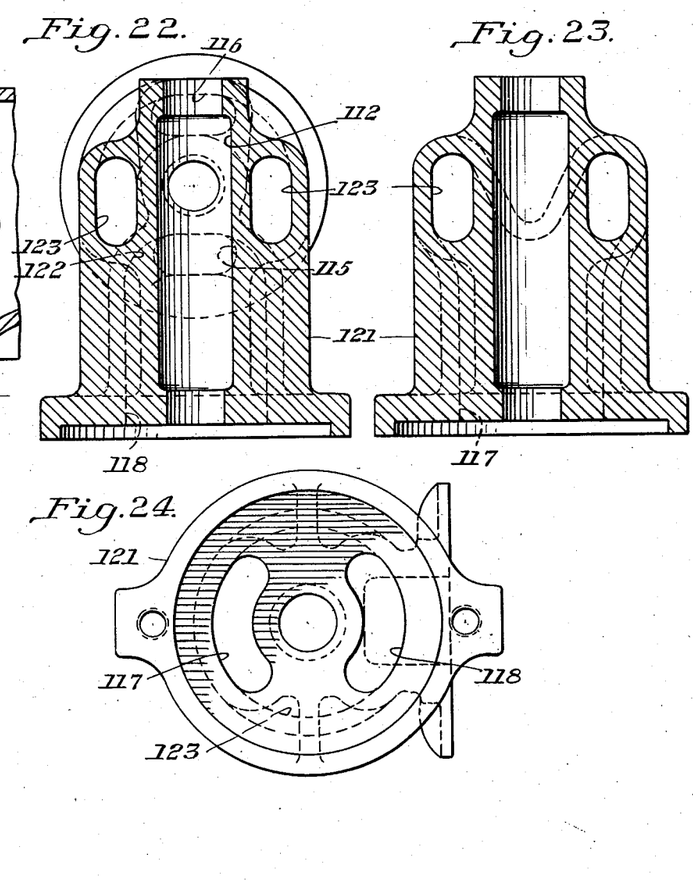

Figure 17 is a view similar to Figure 10, showing the pump secured to the hoist casting by means of a cross-over adapter;

Figure 18 is a side elevation of the adapter shown in Figure 17, to an enlarged scale, looking at the end secured to the hoist casting;

Figure 19 is a sectional view along line XIX—XIX of Figure 17;

Figure 20 is a plan view of the end of the adapter to which the pump is secured;

Figure 21 is a view similar to Figure 17, showing an adapter in which the passages do not cross over;

Figure 22 is a sectional view along the line XXII—XXII of Figure 21, looking in the direction of the arrows;

Figure 23 is a sectional view along the same line looking in the opposite direction; and Figure 24 is a bottom plan view of the adapter shown in Figures 21 through 23.

Referring in detail to the drawings, the invention is especially adapted for application to a vehicle such as that illustrated at 10 in Figure 1. The vehicle 10 comprises a frame or chassis having side members 11 and a cross member 12, as well as other members which are immaterial to the invention. The driving gear of the vehicle is indicated at 13 and is adapted to be connected to the wheels 14 thereof in the usual manner. Longitudinal members 15 rest on the frame members 11 and support a body 16 which is arranged to tilt about an axis 17 for rear dumping. The body 16 has longitudinal channels 16a on the bottom thereof, the lower edges of which fit over the members 15 when the body is lowered, to insure proper alinement thereof with the chassis. The construction of the body is otherwise not material to the invention, but may preferably include a rear gate 18 adapted to be controlled through suitable linkage by a latching lever 19.

The details of the body 16 and the mounting thereof on the chassis members 11 are more fully described and claimed in my co-pending applications Serial No. 522,642, filed March 14, 1931, and Serial No. 592,470, filed February 12, 1932.

Bearing brackets 20 are bolted to the inside of the webs of the channels 16a to provide bearings for an upper trunnion block 21. Similar brackets 22 are bolted to the channels 15 to provide bearings for a lower trunnion yoke 23.

A hoist 24 includes a unitary casting 25 which is provided with trunnions 26 seating in suitable bearings in the trunnion yoke 23, and a hollow plunger 27 reciprocable within a cylinder 28 formed integral with the casting 25. The plunger 27 is pivoted to the trunnion block 21 by a pin 29.

The casting 25 comprises, in addition to the cylinder 28, a reservoir 30 and a valve seat 31 for a plug type valve. The reservoir 30 has a filling spout 32, a vent plug 33 and is connected to the cylinder 28 through a relief valve 34. The trunnions 26 are bored and closed by the plugs 35. The plunger 27 comprises an open bottomed cylinder with an eye 36 formed in a projection integral with the closed end thereof for receiving the pin 29. Adjacent the open end, the plunger 27 is provided with a stud 37, the end of which is adapted, when the plunger is extended, to engage the ball check valve 34 to open the latter and relieve the pressure within the cylinder 28 by connecting it with the reservoir 30. The ball check valve 34 is urged against its seat by a spring 38 and is adapted to operate in a cage 39 formed integral with the casting 25, and is maintained in position by a plug 40. The upper end of the cylinder 28 is provided with a packing gland consisting of a seating ring 41, a packing ring 42 and a compression ring 43.

As will be apparent from an inspection of Figures 5 and 7, the reservoir 30 surrounds the cylinder 28 on two sides thereof, the side chambers being indicated at 30a and 30b. These chambers are connected by a passage 30c. At the lower end of the chambers 30a and 30b, a head providing a sump 44 is formed. The end walls 45 thereof are machined to receive either a cover plate 46 or a pump housing 47. A through bolt 48 clamps the cover plate and pump housing to the lower end of the casting 25 and the relative positions of the plate and housings may easily be reversed. Clamping lugs 46a and screws 47a are also employed to draw the plate and housing into position.

The end walls 45 of the sump chamber 44 are exact duplicates and are provided with discharge ports 49 and supply ports 50. As shown in Figure 6, the discharge ports 49 communicate directly with the sump chamber 44 and permit fluid to pass from the latter through the port into an inlet passage 51 of the pump 47. The supply ports 50 are connected to a passage 52 leading to the valve seat 31, through passages 53. The passage 52 opens into the valve seat 31 at 53. The ports 49 and 50 are arcuate in outline and since the pump housing 47 is secured to the casting 25 only by means of the through bolt 48, the pump housing may be adjusted about the bolt 48 as an axis to obtain the proper adjustment of the housing relative to the casting 25. The front wall of the sump chamber is provided with drain ports 54 closed by plugs 55 under normal conditions. The valve seat 31 is also provided with ports 56 communicating directly with the sump chamber 44.

A valve plug 57 fits in the valve seat 31. The valve plug 57 has an axial bore 58 provided with a ball check valve 59. Communicating with the axial bore 58 of the valve plug 57 are ports 60 and 61. The ports 60 communicate with the passage 52 in any position of the valve plug 57. The ports 61 in the valve plug communicate with the ports 56 in the valve seat when the plug is in a certain position, as shown in Figures 11 and 12. The valve seat 31 and the axial bore in the valve plug 57 open directly into the plunger 27 in the cylinder 28. The valve plug 57 is secured in the seat by a bushing 62. The bushing is provided with packing 63 and a compression spring 64. A reduced end 65 of the valve plug projects through the bushing and is adapted to be operated by a crank 66. One end of the crank carries a stop screw 67 which limits the movement of the crank 66. Another arm of the crank 66 is connected through a link 68 to a bell crank 69. A connecting rod 70 extends from the one end of the bell crank 69 to a control lever in the driver's cab.

The pump 47 is driven from a power take-off through a sliding sleeve connection 71 and a universal joint 72. The mounting of the hoist mechanism at an acute angle to the horizontal reduces the angular movement of the hoist in a vertical plane, as the result of the hoisting operation. This limited angular movement is readily taken care of by the universal joint 72 and the longitudinal displacement of the latter is accommodated by the sliding sleeve connection 71.

Figure 14 illustrates a modified form of safety limit stop similar in effect to that shown in Figure 13. The modification of Figure 14, however, is adapted for use with hoist mechanisms having a plurality of nesting plungers reciprocating in a cylinder. The cylinder in Figure 14 is indicated at 80 and the plungers nesting therein at 81 and 82. The cylinder 80 is provided with a relief valve 83 similar to that shown at 34 in Figure 13, except that the valve 83 is adapted to be opened by the clockwise movement of a lever 84 pivotally supported in a cage 85, which serves as a guide for the movement of the valve parts.

A tube 86 having an enlarged end 87 is slidably mounted in a sleeve 88 threaded in the end wall of a reservoir 89 surrounding the cylinder 80. Nesting within the tube 86 is a tube 90, and within the tube 90 is a rod 91 slidably positioned. The rod 91 is adapted to be adjustably clamped to a bracket 92 secured to an eye 93 formed integral with the end wall of the inner plunger 82. When the plungers 81 and 82 are extended, the movement of the bracket 92 will withdraw the rod 91, the tube 90 and finally the tube 86 through the sleeve 88 from the position illustrated, until the enlarged end 87 on the tube 86 engages the bell crank 84 which is provided with fingers 84a partially surrounding the tube 86.

The engagement of the end 87 of the tube 86 with the fingers 92 will shift the bell crank 84 and open the valve 83 to relieve the pressure within the cylinder 80 and prevent further extension of the plungers. When the hoist is lowered, the tubes 86 and 90 and the rod 91 collapse to the illustrated position. Since the rod 91 is adjustably clamped to the bracket 92, the point at which the relief valve opens may be varied to suit requirements of particular cases.

It sometimes happens that a truck embodying the hoist mechanism herein described will be started while the body is in its raised or dumping position. This places an intermittent tension load on the hoist and it is desirable, therefore, that the safety limit stop mechanisms be sufficiently substantial to withstand the shocks. Such a form of the safety limit stop mechanism is shown in Figures 15 and 16, in which the safety limit valve 34 in the upper end of the cylinder 28 has the same form as shown in Figure 13. Within the cylinder 28, an outer sleeve 95 is reciprocable. The sleeve 95 is similarly provided with an inner sleeve 96. The ends of the sleeves 95 and 96 are provided with perforated plates 97 and 98. Each plate has a cushion 99 thereon. The plate 97 is cut out at its periphery in line with the ball of the valve 34, so that when the sleeves 95 and 96 are extended from the cylinder 28, the plate 97 on the sleeve 95 will engage the sealing ring 41 in the outer end of the cylinder, but will not engage the ball to open the valve 34. A follower 100 is slidable in the cylinder 28 and is provided with a tongue 101 projecting into the peripheral cut-out in the perforated plate 97. The follower 100 is spaced from the sleeve 95 by a spring 102 surrounding a rod 103. The rod 103 traverses the central opening in the plate 97 and has a reduced threaded end to which the follower 100 is secured.

A guide rod 104 is threaded in a hole in the plate 97 and passes freely to the plate 98 and the follower 100.

When oil pressure is applied to the cylinder 28, the sleeves 95 and 96, the plates 97 and 98 and the follower 100 move out of the cylinder as a unit. None of the sleeves, plates and follower continues until the cushion ring 99 on the sleeve 95 engages the sealing ring 41 threaded into the end of the cylinder 28. Because of the peripheral cut-out in the plate 97, the ball 34 is not actuated. Under continuing fluid pressure, the inner sleeve 96 moves out of the sleeve 95. Movement of the plate 97, the follower 100 and the rods 103 and 104 is, of course, prevented. When the sleeve 96 nears the end of its movement, the plate 98 engages an enlarged head 105 on the end of the rod 103. Further movement of the sleeve 96, of course, causes a corresponding movement of the follower 100. When the follower 100 moves with the sleeve 96, the lug 101 on the follower which is in line with the ball of the valve 34 engages the ball to open the valve. The pressure in the cylinder 28 is thus relieved and further extension of the hoist is prevented.

The rod 104 serves merely to maintain proper alinement of the sleeves 95 and 96 and the follower 100. The rod 103, however, serves to take up the shock in case the truck is started while the hoist is extended. In such case, the inertia of the elevated body tends to extend the hoist further. Such shocks are transmitted through the sleeve 96, the plate 98, which is secured thereto, the rod 103, the enlarged end 105 of which engages the plate 98, and from the rod 103 to the main hoist casting through the follower 100. All these parts are substantially designed so that there is no danger of breakage in case the contingency mentioned arises in operation.

In order to simplify the assembly of the various parts of the safety limit stop mechanism described, the perforations in the plates 97 and 98 are in the form of key-hole openings 106 and 107. Normally these openings are at right angles to each other, as shown in Figures 15 and 16, but they are lined up for assembly purposes. The head of the rod 103 is passed through the alined key-hole openings, after which the plates 97 and 98 are shifted 90° and the rod 104 is passed through the plates to prevent shifting. The head of the rod 104, in addition to guiding the plates 97 and 98, limits the movement of the follower 100 relative to the sleeves 95 and 96.

The point in the hoist travel at which the safety limit stop functions can be varied by changing the length of the rod 103. The construction described can, of course, be employed for hoists having a larger number of nesting sleeves than shown in the drawings.

In order to increase the range of adaptability of the invention to automotive vehicles of different types and designs, I provide means for mounting the pump 47 not only in the position illustrated in Figure 10, but also in a position substantially at right angles thereto. The means for so mounting the pump comprises an adapter 110. As shown in Figure 17, the adapter 110 is a casting having a face 111 which may be secured to the hoist casting 25 by the through-bolt 48 and the screws and clips employed for securing the pump thereto, as shown in Figure 10. The adapter 110 has a central bore 112 adapted to be traversed by a through-bolt 113 effective for securing the pump 47 to the adapter in contact with the lower face 114 thereof. The pump is secured to the face 114 in the same manner in which it is secured to the hoist casting 25 in Figure 10.

The adapter 110 has ports 115 and 116 adapted to communicate with the ports 49 and 50 of the casting 25. The ports 115 and 116 are arcuate in shape to permit of the adjustment of the adapter 110 in the same manner as described for the pump 47 when secured directly to the casting 25, as in Figure 10. The adapter also has ports 117 and 118 communicating with the inlet and discharge ports of the pump 47. When the adapter is used, it is generally more satisfactory to drive the lower impeller of the pump.

In different types of vehicles, it may be necessary to drive the pump impellers in different directions. In order to take care of this contingency, the adapter 110 may be provided with passages connecting the ports 115 and 116 to the ports 117 and 118 respectively, or these ports may be connected in reverse order. In the adapter shown in Figures 17 through 20, the port 116 is connected to the port 118 by a passage 119. Correspondingly, the port 115 is connected to the port 117 by a passage 120.

The ports 117 and 118 are likewise arcuately shaped, as shown in Figure 20, so that the pump 47 may be adjusted about the axis of the through-bolt 113. Similarly, the pump 47 and the adapter 110 may be adjusted about the axis of the through-bolt 48 so that a universal adjustment of the pump 47 is made possible. This permits the invention to be applied almost to any design or type of automotive vehicle. The adapter illustrated in Figures 17 through 20 and described in the preceding paragraphs has its passageways 119 and 120 disposed in cross-over relation. This permits the invention to be applied to a vehicle in which the direction of drive of the usual power take-off is the reverse of that contemplated by the structure of Figure 10.

Figures 21 through 24 illustrate another form of adapter in which the passageways connecting the ports thereof do not cross over but extend in substantial side by side relation. This adapter will be used when the direction of rotation of the power take-off shaft is the same as that contemplated by the structure of Figure 10. The adapter shown in Figure 21 will be used, of course, only when the relative position of the power take-off shaft and the desired hoist mounting make it necessary.

Figure 21 illustrates an adapter 121 which is secured to the casting 25 by a through-bolt 48 and the cooperating screws and clips, as in the case of the adapter shown in Figure 17. The pump 47 is secured to the adapter 121 by the through-bolt 113. The adapter 121 is provided with ports 115, 116, 117 and 118, corresponding to the ports formed in the adapter 110. In short, the adapter 121 is similar in all respects to the adapter 110, except for the disposition of the passageways connecting the ports. The adapter 121 includes a passage 122 directly connecting the ports 115 and 118. The adapter 121 also includes parallel passages 123 surrounding the through-bolt 113 and connecting the port 116 directly to the port 117. The fluid circuit of the combination of devices shown in Figure 21 is thus exactly the same as that of the arrangement shown in Figure 10. The direction of rotation of the pump impellers must, therefore, be the same. In Figure 17 the fluid circuit includes a cross-over so that the pump must be driven in the reverse direction.

Having now described in detail the construction of the invention, I shall briefly outline the method of its operation. In the description of operation, it will be assumed that the dumping body 16 occupies the position in which it is illustrated in Figure 1, and that the valve plug 57 is positioned so that its ports 61 are in alinement with the ports 56 of the valve seat 31. Such being the case, the plunger 27 and cylinder 28 will be in communication with the sump chamber 44. The power take-off driving the pump 47 may be disengaged from its driving shaft. If so, the pump does not operate and no fluid is supplied thereby to the inlet ports of the hoist. If the pump is operated, however, there will be no tendency for the hoist to be extended. The fluid will merely circulate idly. The pump 47 when operating sends fluid through the inlet ports 50 and the passageway 52, from which it passes into the axial bore of the valve plug 57 through the ports 60 therein. The end of the passageway 52 adjacent the plate 46 being closed, sufficient pressure is created to open the ball check valve 59 in the valve plug 57. Since the ports 61 in the valve plug and the ports 66 are in line, however, the interior of the valve plug is in direct communication with the sump chamber 44 and the fluid is not effective to extend the hoist, but merely returns to the sump chamber to pass to the pump and thence again through its idling circuit. Since the ball check valve 59 has only a light spring behind it, the pressure on the fluid while circulating idly is small.

When the valve plug 57 is shifted by movement of the rod 70, crank 69 and associated mechanism to a position such that the ports 61 in the valve plug are no longer in alinement with the ports 56 in the valve seat, the fluid under pressure is no longer vented to the sump chamber, but must flow into the cylinder 28. Continued operation of the pump will, therefore, extend the plungers of the hoist. Such movement will continue until the relief valve 34 is opened, whereupon the fluid trapped in the cylinder 28 flows into the reservoir chamber 30a and thence into the sump chamber 44. If the pump 47 stops operating at any time, the ball check valve 59 operates to hold the truck body in its tilted position and prevents downward movement thereof. When the hoist body has been raised to the limiting position, the pump may continue to operate circulating fluid through the relief valve, as above stated, or the pump may be stopped. In either case, the load is held up. The body cannot be lowered until the valve plug 57 is again shifted by movement of the lever 70 to a position such that the ports 61 in the vlave plug line up with the ports 56 in the valve seat. When this condition exists, of course, the cylinder 28 has direct connection with the sump chamber 44 and the fluid in the cylinder passes into the sump chamber and reservoir under the influence of the weight of the uplifted body.

The operating valve 57 thus has only two positions, namely, raise and lower. In the raising position, the lowering of the truck body is prevented by the ball check valve, and in the lowering position, the hoist cylinder is connected to the reservoir. The rate of lowering the body may be controlled by the rate of shifting the valve to the lowering position. The ball check valve 59 adds greatly to the safety of operation of the hoist. The safety limit stop valve also prevents over-extension of the hoist and also prevents the building up of excessive pressures in the hoist cylinder. This device will also function when some obstruction prevents the extension of the jack, so that no injury will be done to any part of the apparatus.

Briefly summarizing the features of construction hereinabove mentioned, the principal advantages of the construction described include the flexibility provided by the double trunnion at the top and bottom of the hoist. This construction prevents any tendency for the body to twist in hoisting, when it is not uniformly loaded or is standing on uneven ground. By disposing the hoist at an acute angle to the horizontal, a lower mounting height therefor is obtained. The forward or lower end of the hoist is mounted ahead of the cross beam in the chassis frame, while the rear or upper end of the hoist is mounted ahead of the center of gravity, to provide a large moment arm for the lifting force. This moment arm is increased rapidly as soon as the upward movement of the body commences, and at the end of the hoist stroke, the arm is a maximum. The increasing moment arm makes it unnecessary to use high pressures on the smaller sleeves, in the case of a nesting hoist.

All oil lines are omitted, since the unitary casting permits direct connections to be made to all parts of the device. The control valve is part of the hoist casting and thus has a fixed position which simplifies mounting problems. Since the angular movement of the hoist in a vertical plane is very small, the pump shaft is substantially alined with the driving shaft of the power take-off. The pump may be mounted on either side of the hoist casting for convenience, and can be adjusted to the proper angle with respect thereto.

The wide adjustability of the pump with respect to the hoist casting when mounted directly thereon, and the increased adjustability resulting from the use of the various types of adapter described, make it possible to apply the invention to almost any type of automotive vehicle, regardless of its peculiarities of design and construction, or the details of the location and mounting of the power take-off mechanism which is standard equipment on most motor trucks.

Although I have illustrated and described herein but one form of the invention, with a modification of one feature thereof, the scope of the invention is not limited to the embodiment described. The invention may, of course, be practiced in other forms within the scope of the following claims, without departing from the spirit of the invention or sacrificing its advantages.

I claim:

1. In a hydraulic hoist, a cylinder, telescoping sleeves slidable therein, a relief valve in the wall of the cylinder, and means connected to the innermost sleeve and slidable along the inner cylinder wall for displacing the relief valve.

2. In a hydraulic hoist, a cylinder, a plurality of extensible sleeves positioned therein, a relief valve in the wall of the cylinder, a follower slidable in the cylinder having a tongue for displacing the relief valve, said follower having a loose connection with the outer sleeve, and means for positively actuating the follower upon a predetermined extension of the inner sleeve.

3. A hydraulic hoist for tilting vehicle bodies comprising a yoke trunnioned in a supporting frame, a cylinder casting trunnioned in said yoke, a storage tank embracing said cylinder, said casting having a valve bore adjacent one end of the cylinder and on its center line but at an angle thereto, a sump in the casting, said bore having ports communicating therewith, said casting also having passages extending laterally from said bore to inlet ports on opposite sides of the casting, and a pump and cover plate interchangeably attached to the casting cooperating with said passages, respectively.

4. In a hydraulic hoist, a cylinder, a port in one end thereof, a valve having a bore communicating with said port, a reservoir adjacent said port, inlet conduits extending laterally of the bore in opposite directions, said bore having ports communicating with said reservoir, and a pump and cover plate interchangeably attached to the cylinder cooperating with said conduits, respectively.

5. In a hydraulic hoist, a cylinder, a tank surrounding the cylinder, a valve seat disposed centrally of the cylinder, said seat having ports connecting with said tank and said cylinder, conduits extending laterally of the seat in opposite directions to inlet ports, and a valve plug in said seat having alined communicating ports registrable with said tank and inlet ports, a check valve in the plug between said alined communicating ports, and a pump and cover plate interchangeably attached to the cylinder cooperating with said conduits, respectively.

6. A hydraulic hoist comprising a casting including a reservoir and a hoist cylinder, a head on said casting having a valve bore communicating with said cylinder, said head having passages extending from opposite sides thereof to said bore, a sump in said head communicating with said reservoir, ports on opposite sides of the head for discharging fluid from said reservoir, and an interchangeable pump and cover plate cooperating with said passages and ports.

7. In a hydraulic hoist, a casting including a cylinder and a reservoir, a head on said casting having a valve bore communicating with said cylinder and said reservoir, said head also having a transverse passage intersecting said bore, said passage terminating in inlet ports on opposite sides of the head, and an interchangeable pump and cover plate cooperating with said ports, respectively.

8. In a hydraulic hoist, a casting including a cylinder and reservoir chambers on opposite sides of the cylinder, a head at one end of the casting including a sump communicating with said chambers, said head having a valve bore communicating with the cylinder, and a transverse passage intersecting said bore and terminating in inlet ports on opposite sides of the head, and an interchangeable pump and cover plate cooperating with said ports, respectively.

9. In a hydraulic hoist, a cylinder, a head at one end of said cylinder, a valve in said head, and a passage for supplying fluid to the cylinder through said valve, said passage terminating in an arcuate port, a bolt extending across said head substantially parallel to said passage, and a pump mounted on said bolt having a port in alinement with said arcuate port and being rotatably adjustable on said bolt, a cover plate on the bolt overlying the other end of the head, the plate and pump being interchangeable.

10. In a hydraulic hoist, a casting comprising a cylinder and a reservoir, a head at one end of the casting having plane side faces with arcuate ports therein, a pump casing secured to one of said faces for receiving fluid from the reservoir and delivering it to the cylinder through certain of said arcuate ports, said pump being rotatably secured to said head about an axis transverse of the latter, and containing the center of curvature of said arcuate ports.

11. In a hydraulic hoist, a casting including a reservoir and a cylinder, a head at one end of said casting, a valve bore extending through said head into said cylinder and having ports communicating with said reservoir, a transverse passage in said head intersecting said bore, a pump adapted to be attached to either side of said head in communication with said passage, a cover plate on the other side, closing said passage, and a rotatable plug in said bore having an axial hole therein and transverse holes in alinement with said ports and said passage.

12. In a hydraulic hoist, a casting including a reservoir and a cylinder, a head at one end of the cylinder, a valve bore in said head extending into said cylinder, ports in said bore communicating with the reservoir, a rotatable plug in said bore having an axial hole and spaced transverse holes, one of said transverse holes being in alinement with said ports, a transverse passage extending across said head and around said bore, in communication therewith and in alinement with the other transverse hole through the plug, a pump adapted to be attached to either side of said head in communication with said passage, and a cover plate on the other side, closing said passage and terminating in inlet ports on opposite sides of the head.

CAMILLE P. GALANOT.